United States Patent
Benco et al.

(10) Patent No.: US 6,839,023 B1
(45) Date of Patent: Jan. 4, 2005

(54) NETWORK SUPPORT FOR ACCESS TO LOCATION INFORMATION OF A MOBILE DEVICE

(75) Inventors: David S. Benco, Winfield, IL (US); Kevin J. Overend, Elmhurst, IL (US); Baoling S. Sheen, Naperville, IL (US); Sandra Lynn True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/696,065

(22) Filed: Oct. 29, 2003

Related U.S. Application Data

(63) Continuation-in-part of application No. 10/601,945, filed on Jun. 23, 2003.

(51) Int. Cl.$^7$ ............................ G01S 5/14; H04M 1/15; H04Q 7/20
(52) U.S. Cl. ............................ 342/357.1; 379/142.1; 455/456.5
(58) Field of Search ........................ 342/357.07, 357.1, 342/357.09, 357.08; 455/456.3, 456.5, 414.2, 456.2; 379/142.1, 142.04, 142.06, 201.06, 201.07, 201.08, 201.12

(56) References Cited

U.S. PATENT DOCUMENTS

| | | | | |
|---|---|---|---|---|
| 5,625,668 A | * | 4/1997 | Loomis et al. | 455/456.5 |
| 5,748,084 A | | 5/1998 | Isikoff | |
| 6,091,957 A | * | 7/2000 | Larkins et al. | 455/456.2 |
| 6,609,005 B1 | * | 8/2003 | Chern | 455/457 |
| 2002/0000930 A1 | * | 1/2002 | Crowson et al. | 342/357.1 |
| 2002/0034953 A1 | | 3/2002 | Tricarico | |
| 2003/0016804 A1 | * | 1/2003 | Sheha et al. | 379/201.06 |
| 2003/0052815 A1 | * | 3/2003 | Russell et al. | 342/357.1 |

FOREIGN PATENT DOCUMENTS

| | | | | |
|---|---|---|---|---|
| EP | 0 942 917 | * | 6/1999 | H04M/3/42 |

* cited by examiner

*Primary Examiner*—Gregory C. Issing

(57) ABSTRACT

Geographic coordinates of user equipment of a paged party are determined either by communicating with a GPS receiver associated with the user equipment of the paged party or by cellular triangulation. The geographic coordinates may be converted into an associated common location description. For example the common location description is a city name, an address, or a distance and direction from a landmark. The geographic coordinates, common location description, or an abbreviation thereof, is transmitted to user equipment of a paging party. Using this service, parents may verify the location of their children. Security agencies or delivery services may verify and/or log the location of their personnel.

36 Claims, 5 Drawing Sheets

NETWORK SUPPORT FOR ACCESS TO LOCATION INFORMATION OF A MOBILE DEVICE

This application is a continuation-in-part of U.S. patent application Ser. No. 10/601,945, NETWORK SUPPORT FOR SUBSCRIBER ACCESS TO MOBIILE CALLER LOCATION INFORMATION, filed Jun. 23, 2003, which is incorporated herein by reference.

BACKGROUND

The present invention is directed to the art of providing information about a paged party to a paging party. More particularly, the present invention is directed to systems and methods for providing location information regarding a paged party to the paging party where the paged party is using mobile user equipment such as a mobile or cellular phone, personal digital assistant (PDA) or other device.

In the United States, the Federal Communications Commission (FCC) is requiring wireless carriers to be able to locate users on their network when they make a 911 emergency call. Regulations in this area are referred to generally as Enhanced 911 or E911. As a result, various user locating technologies have been, and are being, implemented in wireless communications networks. For example, some user equipment, such as, mobile phones and personal digital assistance (PDAs) include global positioning system receivers and can provide GPS coordinates of the user equipment to the mobile network over which they communicate. Other locating systems do not rely on GPS technology.

Instead, cellular triangulation techniques are used. Some cellular triangulation techniques measure the signal strength of the target piece of user equipment at, for example, three or more cell sites, and use those measurements to determine a distance to the user equipment from each of the cell sites. Other cellular triangulation techniques are based on a measurement of time delays of signals transmitted from the user equipment to the plurality of cell sites. The time delays are used to calculate distances. Additionally, or alternatively cellular triangulation can include the use of directional antennas. By rotating a directional antenna and monitoring the strength of signals from the user equipment an antenna orientation associated with a strongest or weakest signal strength can be determined. That antenna orientation is associated with a direction to the user equipment. By projecting vectors from two or more cell sites toward the user equipment an intersection of the vectors can be found. The intersection of the vectors is the location of the user equipment.

Location information regarding parties can be useful in situations beyond the 911 emergency call scenario. For example, parents may want to verify the location of their children. Dispatchers may want to verify or accurately determine the location of security or delivery personnel. Parole officers can use location information to determine whether or not parolees are within prescribed boundaries.

Therefore, there is a desire to provide location information regarding paged parties to paging parties on a more general basis than is currently available.

SUMMARY

A method operative to provide paged party location information in information made available to user equipment of a paging party includes receiving a call request from the paging party, extracting paged party identification information from the call request, determining that the paged party subscribes to location service based on the extracted called party identification information, determining a location of the paged party, and transmitting a message including a description of the location to the user equipment of the paging party.

Determining that the paged party subscribes to the location service can include accessing user subscription information of a subscriber database of the paged party.

Determining the location of the paged party can include determining that the user equipment of the paged party includes a GPS receiver, and, requesting GPS coordinates from the user equipment of the paged party.

Additionally, or alternatively, determining the location of the paged party can include determining that the user equipment of the paged party does not include a GPS receiver and requesting coordinates of the paged party user equipment from a reference cell cite of the user equipment of the paged party.

For example, determining a location of the paged party can include determining that the user equipment of the paged party does not include a GPS receiver and requesting coordinates of the user equipment of the paged party be determined by cellular triangulation.

For instance, requesting coordinates of the paged party user equipment from a reference cell cite of the user equipment of the paged party can include transmitting a first PSMM_Request message from a first cell site to the user equipment of the paged party, receiving a first response to the first PSMM_Request message, determining a first delay from the first response, transmitting a second PSMM_Request message from a second cell site to the user equipment of the paged party, receiving a second response to the second PSMM_Request message, determining a second delay from the second response, transmitting a third PSMM_Request message from a third cell site to the user equipment of the paged party, receiving a third response to the third PSMM_Request message, determining a third delay from the third response, and determining a relative position of the user equipment of the paged party to the first, second and third cell sites based on the first, second and third delays.

More generally, requesting coordinates of the paged party user equipment from a reference cell cite of the user equipment of the paged party can include transmitting a plurality of PSMM_Request messages from a plurality of cell sites to the user equipment of the paged party, receiving a plurality of responses to the plurality of PSMM_Request messages, determining a plurality of delays from the plurality of responses, and determining a relative position of the user equipment of the paged party to the plurality of cell sites from the plurality of delays.

Some embodiments include calculating an absolute position of the user equipment of the paged party from the relative position of the user equipment and known positions of the first second and third cell sites.

Some embodiments include calculating an absolute position of the user equipment of the paged party from the relative position of the user equipment and known positions of the plurality of cell sites.

Additionally, some embodiments include determining a common description of the location of the paged party.

Determining the common description can include receiving the GPS coordinates and using the GPS coordinates as an index into a common location description database to determine at least one of an address, a city name, and a distance and heading from a landmark.

Where coordinates are determined by other means, such as cellular triangulation, determining the common description can include receiving those coordinates and using the coordinates as an index into a common location description database to determine at least one of an address, a city name, and a distance and heading from a landmark.

Some embodiments include verifying that the paging party is included in a list of potential paging parties to which the paged party location information is to be provided.

Some embodiments include a method operative to provide paged party location information to user equipment of a paging party. The method includes receiving a call request from the paging party, extracting paged party identification information from the call request, determining that the paged party subscribes to a location service based on the extracted paged party identification information, determining if the user equipment of the paged party is GPS enabled, requesting GPS coordinates from the user equipment of the paged party if the user equipment of the calling party is GPS enabled, requesting cellular triangulation services be used to generate location information regarding the user equipment of the paged party if the user equipment of the paged party is not GPS enabled, determining a common description of a location of the paged party based on the GPS coordinates or the generated location information, including a representation of the common description of the location in a field of a message, and transmitting the message to the user equipment of the paging party.

Some of those embodiments include extracting paging party user equipment identification information from the call request, retrieving a list of potential paging party user equipment for which the paged party desires to provided location information, comparing the extracted paging party user equipment identification information to entries in the list of potential paging party user equipment, and determining that one of the entries in the list matches the extracted paging party user equipment identification information.

Determining that the paged party subscribes to a location service based on the extracted paged party identification information can include querying a subscriber database associated with the paged party and retrieving location feature subscription information regarding the paged party.

Determining if the user equipment of the paged party is GPS enabled can include extracting paged party user equipment identification information from the call request, retrieving a list of potential paging party user equipment to which the paged party location information is to be provided, and retrieving GPS enablement status information regarding the paged party user equipment.

Additionally, or alternatively, determining if the user equipment of the paged party is GPS enabled can include sending a GPS enablement query message to the user equipment of the paged party.

Requesting cellular triangulation services can include transmitting a plurality of PSMM data collection messages to a respective plurality of cell sites within range of the user equipment of the paged party.

A system operative to provide paged party location information to user equipment of a paging party can include means for receiving a page request from the paging party, means for extracting paged party identification information from the page request, means for determining that the paged party subscribes to a location service based on the extracted paged party identification information, means for determining a location of the paged party, means for including a description of the location of the paged party in a message, and means for transmitting the message including the description of the location to the user equipment of the paging party.

The means for determining that the paged party subscribes to the location service can include means for accessing user subscription information of a subscriber database of the paged party.

The means for determining a location of the paged party can include means for determining that the user equipment of the paged party includes a GPS receiver and means for requesting GPS coordinates from the user equipment of the paged party.

The means for determining a location of the paged party can include means for determining that the user equipment of the paged party does not include a GPS receiver and means for requesting coordinates of the paged party user equipment from a reference cell cite of the user equipment of the paged party.

Additionally, or alternatively, the means for determining a location of the paged party can include means for determining that the user equipment of the paged party does not include a GPS receiver and means for requesting coordinates of the paged party user equipment be determined by cellular triangulation.

For example, some embodiments include means for transmitting a plurality of PSMM_Request messages from a plurality of cell sites to the user equipment of the paged party, means for receiving a plurality of responses to the plurality of PSMM_Request messages, means for determining a plurality of delays from the plurality of responses, and means for determining a relative position of the user equipment of the paged party to the plurality of cell sites from the plurality of delays.

Additionally, some embodiments include means for calculating an absolute position of the user equipment of the paged party from the relative position of the user equipment and known positions of the plurality of cell sites.

The means for determining a description of a location of the calling party can include means for receiving the GPS coordinates and means for using the GPS coordinates as an index into a common location description database to determine at least one of an address, a city name, and a distance and heading from a landmark.

Additionally, or alternatively, the means for determining a description of a location of the calling party can include means for receiving the coordinates, and means for using the coordinates as an index into a common location description database to determine at least one of an address, a city name, and a distance and heading from a landmark.

Some embodiments include means for verifying that the paging party is included in a list of potential paging parties for which the paged party location information is to be provided.

An exemplary system includes a mobile switching center that is operative to provide paged party location information to user equipment of a paging party. The mobile switching center includes a coordinate determiner operative to determine geographic coordinates of user equipment of a paged party, a coordinate converter operative to determine a common description of a geographic location associated with the geographic coordinates determined by the coordinate determiner, and a network interface operative to transmit the common description to the user equipment of the paging party.

In some embodiments, the coordinate determiner can include a GPS coordinate determiner operative to send a request for GPS coordinates to the user equipment of the paged party and receive GPS coordinates from the user equipment of the paged party.

Additionally, or alternatively, in some embodiments, the coordinate determiner can include a cellular triangulator operative to coordinate the collection of measurements associated with the user equipment of the paged party and the calculation of geographic coordinates associated with the location of the user equipment of the paged party based on the collected measurements. For example, the cellular triangulator can be operative to collect the measurements associated with the user equipment through the transmission of a plurality of PSMM_Request messages.

DESCRIPTION OF THE DRAWINGS

The invention may take form in various components and arrangements of components, and/or in various procedures and arrangements of procedures. The drawings are only for purposes of illustrating preferred embodiments. They are not to scale, and are not to be construed as limiting the invention.

DETAILED DESCRIPTION OF THE PREFERRED EMBODIMENTS

Figure 1:
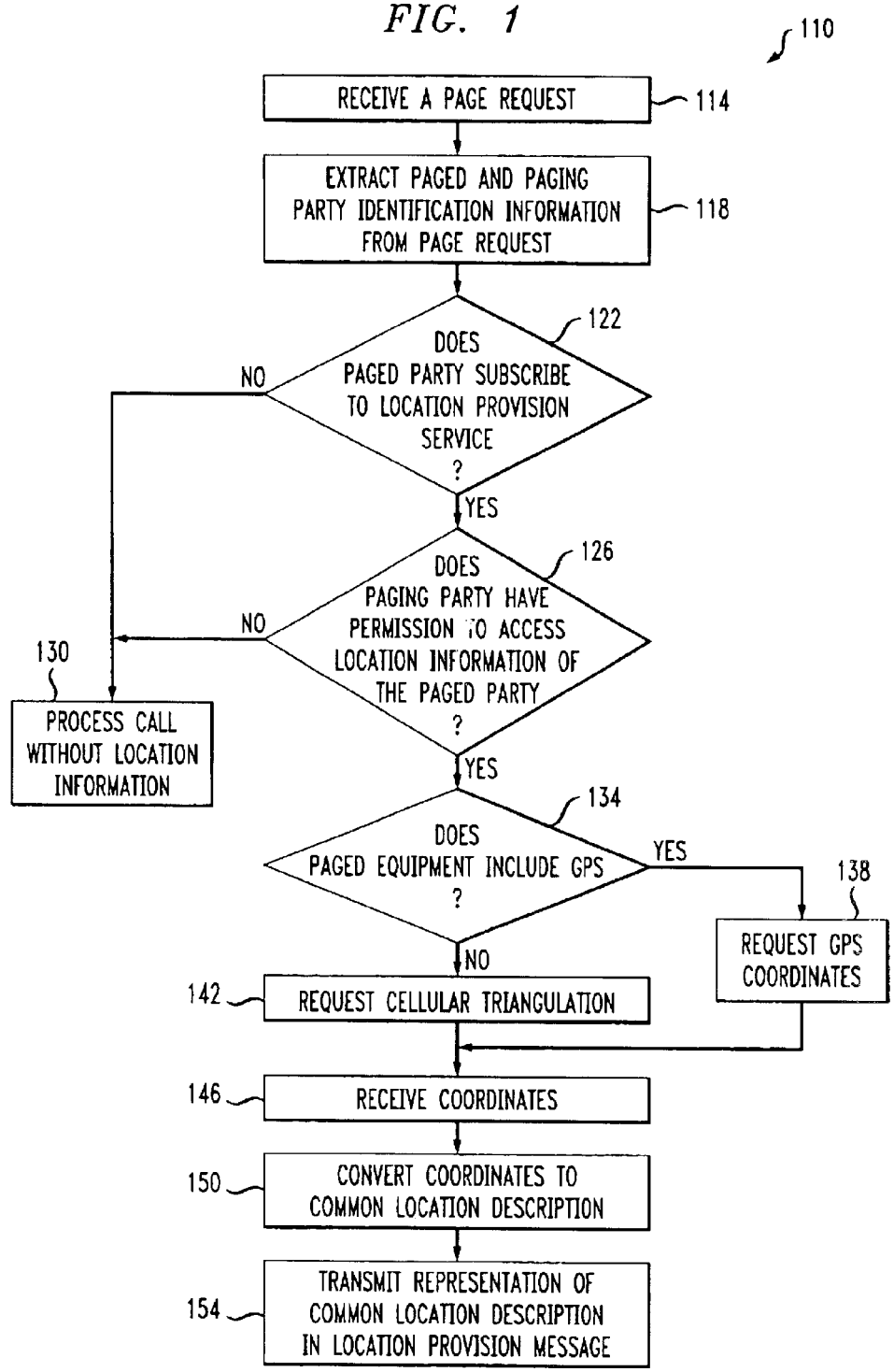
FIG. 1 is a flow chart outlining a method for providing location information regarding mobile user equipment of a paged or called party to user equipment of a location requester or paging party.

Referring to FIG. 1, a method 110 for providing paged party location information to user equipment of a location requestor or paging party begins with the reception on 114 of a page request. If paged party location information is to be provided only under certain circumstances, tests may be performed to determine if the circumstances are met. For example, paging party and paged party identification information may be extracted 118 from the received page request. A determination 122 can be made as to whether the paged party subscribes to a location provision service. If the paged party does subscribe to a location provision service, a determination 126 can be made as to whether the paged party desires to provide location information to the paging party. If 122 the paged party does not subscribe to the location service or if 126 the paged party does subscribe to a location provision service but does not wish to provide location information to the paging party, the call is processed 130 without further concern for location information.

If a determination 122, 126 is made that location information is to be provided to the paging party, the method 110 includes determining a location of the paged party. For example, a determination 134 is made as to whether or not user equipment of the paged party includes Global Positioning (GPS) equipment. If 134 the user equipment of the paged party does include a GPS receiver, a request 138 is made of the user equipment for the current GPS coordinates of the user equipment. If the user equipment of the paged party does not include a GPS receiver, a request 142 is made for cellular triangulation of the paged user equipment of the party. By one method or another, location information or coordinates regarding the paged party or the user equipment of the paged party is received 146.

The received coordinates may be converted 150 into a more common location description. The common location description, or some representation or abbreviation thereof is then transmitted 154 to the user equipment of the paging party. For example, a street address, a city name, or other location description, or an abbreviation therefore, is included in a field of a message transmitted to the user equipment of the paging party. The user equipment of the paging party may then display, read via voice synthesis, log or otherwise process the location description as desired by the paging party.

Extracting 118 paging and/or paged party identification information can include for example extracting caller ID information to identify the paging party. The directory number of the paged party can act as an identifier of the paged party. Additionally, or alternatively, other identifiers can be used, such as, for example, Mobile Identification Numbers or Electronic Serial Numbers.

The paged party identification information can be used to determine 122 whether or not the paged party subscribes to the location provision service. For instance, a directory number of the paged party can be used as an index into a subscriber database containing subscriber service subscription information. For example, the subscription information of the paged party may indicate that the paged party desires to provide location information to everyone that calls or pages the paged party. Alternatively, the subscriber database may include a list of specific individuals or specific user equipment to which location information, regarding the paged party, may be provided. For instance, the list may include a plurality of directory numbers, Mobile Identification Numbers (MINs) and/or Electronic Serial Numbers (ESNs) of user equipment to which location information may be provided. The extracted 118 paging party identification information can be compared to the listed party or user equipment identification information to make the determination 126 as to whether the paged party desires to provide location information to the paging party. In one exemplary scenario, subscriber database information associated with mobile devices of children may be configured to only provide location information regarding the location of the user equipment of the children to user equipment of the parents or guardians of children. Similarly, cellular accounts associated with delivery or service personnel may be configured to respond to page requests received from user equipment of dispatchers and/or customers of the delivery or service personnel.

The location or coordinate information received 146 may be in any convenient format. For example, location information may be received 146 in the form of latitude and longitude. If necessary, conversion 150 of the location information may be performed by network elements. For example, a switching center, Mobile Switching Center (MSC) or visitor location/home location register (VLR/HLR) may house a location look-up database including, for example, common descriptors such as addresses, street names, city names and/or landmark names for a geographic area local to the Mobile Switching Center. Alternatively, a more central location look-up database can include common location descriptors for a much wider area, such as, for example, an entire state, country, continent or for the whole world. Independent of the database configuration or dissemination, the received 146 location information may be used as an index or key into an appropriate location look-up database to determine or retrieve the common descriptor for the location of the user equipment of the calling party.

The common location description can then be transmitted 154 to the user equipment of the paging party. For example, the location descriptor may be appended to, or included in a page request reply message.

Figure 2:
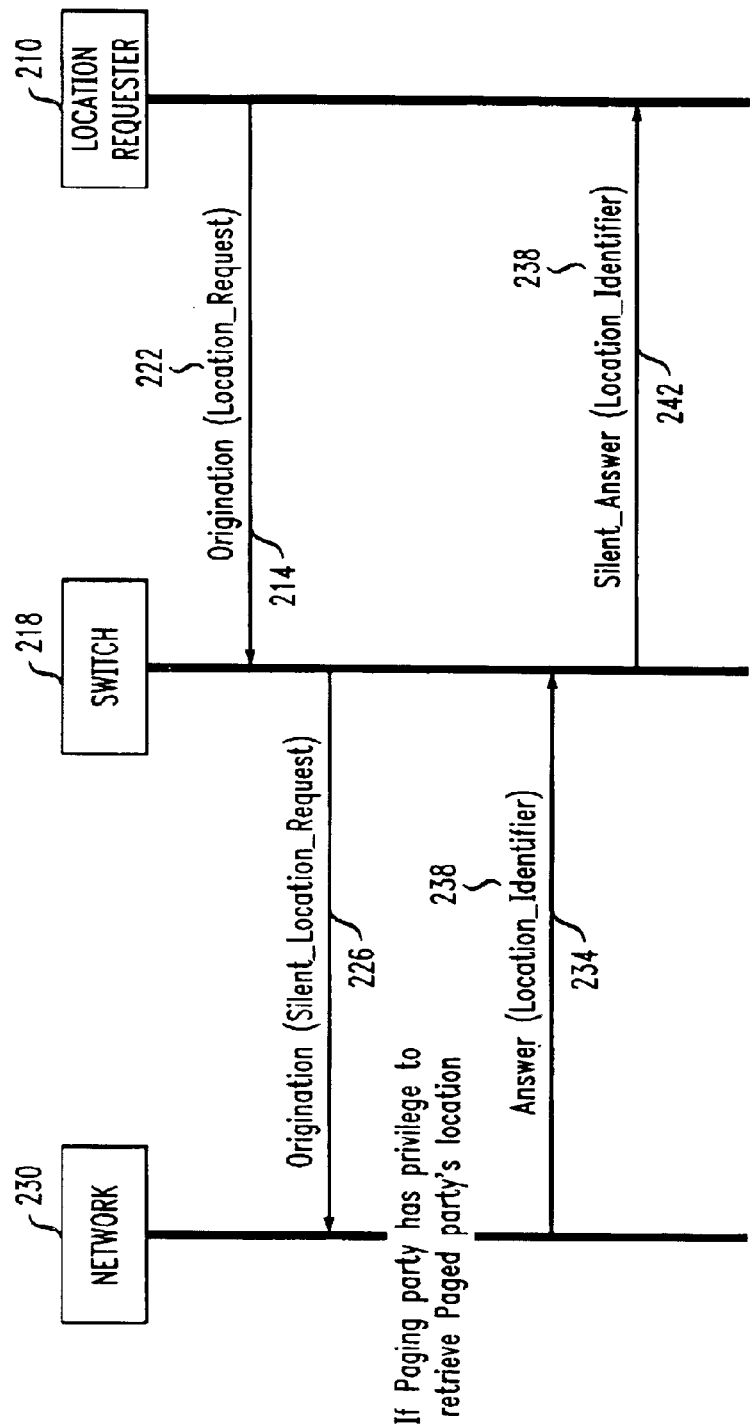
FIG. 2 is a call flow diagram outlining aspects of an embodiment of the method of FIG. 1 related to communications to and from the user equipment of the paging party.

Referring to FIG. 2, in an exemplary scenario, User Equipment of a location requester or paging party 210 transmits an Origination message 214 to a Switch 218. The Origination message 214 includes a location request 222. The User Equipment 210 of the location requester or paging party includes the location request 222 in the origination message or page request 214 based on input of the paging party. For example, the User Equipment 210 of the location requestor or paging party may include a dedicated key or soft key configured to direct the User Equipment 210 of the paging party to generate the specialized Origination message 214 including location request 222. The special key is pressed along with numerical key pad presses for entering the directory number of the paged party. Alternatively, the paging party presses a control sequence of keys, such as, for example, "*77" in addition to the directory number when placing the page request. The control sequence may indicate the specialized nature of the Origination message 214. The Origination message 214 is a page request. However, the Origination message 214 may include a call request. That is, the origination message may result in the user equipment of the paged party being alerted and a call being completed between the location requester and the paged party. Alternatively, the Origination message 214 may be a silent page request. Both kinds of origination messages are referred to herein as page requests.

The Origination message or Page Request 214 is received 114 at the Switch 218. The Switch 218 may be a Mobile Switching Center if the User Equipment 210 of the paging party is a Mobile Device. Alternatively, the Switch 218 may be a land line switching center if the User Equipment 210 of the paging party or location requester is a wired device.

In the exemplary scenario, the Origination message 214 is a Silent Page Request and the Switch 218 relays or transmits a Switch to Network Origination message 226 to a Communications Network 230 associated with a path between the Switch 218 and the paged party. The Network 230 processes the Origination message 226 and generates an Answer message 234 which is transmitted back to the Switch 218. If 122 the paged party subscribes to a location provision service and if the location provision service is configured or provisioned to provide location information to the paging party (or the User Equipment 210 of the paging party) the Answer message 234 includes a location identifier 238. The Switch 218 receives the Answer message 234 including the location identifier 238 and transmits a message 242 to the User Equipment 210 of the paging party or location requester. For example, the message 242 is a Silent Answer message including the location identifier 238 received from the network 230. The User Equipment 210 of the paging party includes a display, and the location identifier is presented to the paging party on that display. Alternatively, the location identifier 238 is processed by a text to voice converter and the answer message 242 includes a synthesized audio message providing the location information to the paging party.

Figure 3:
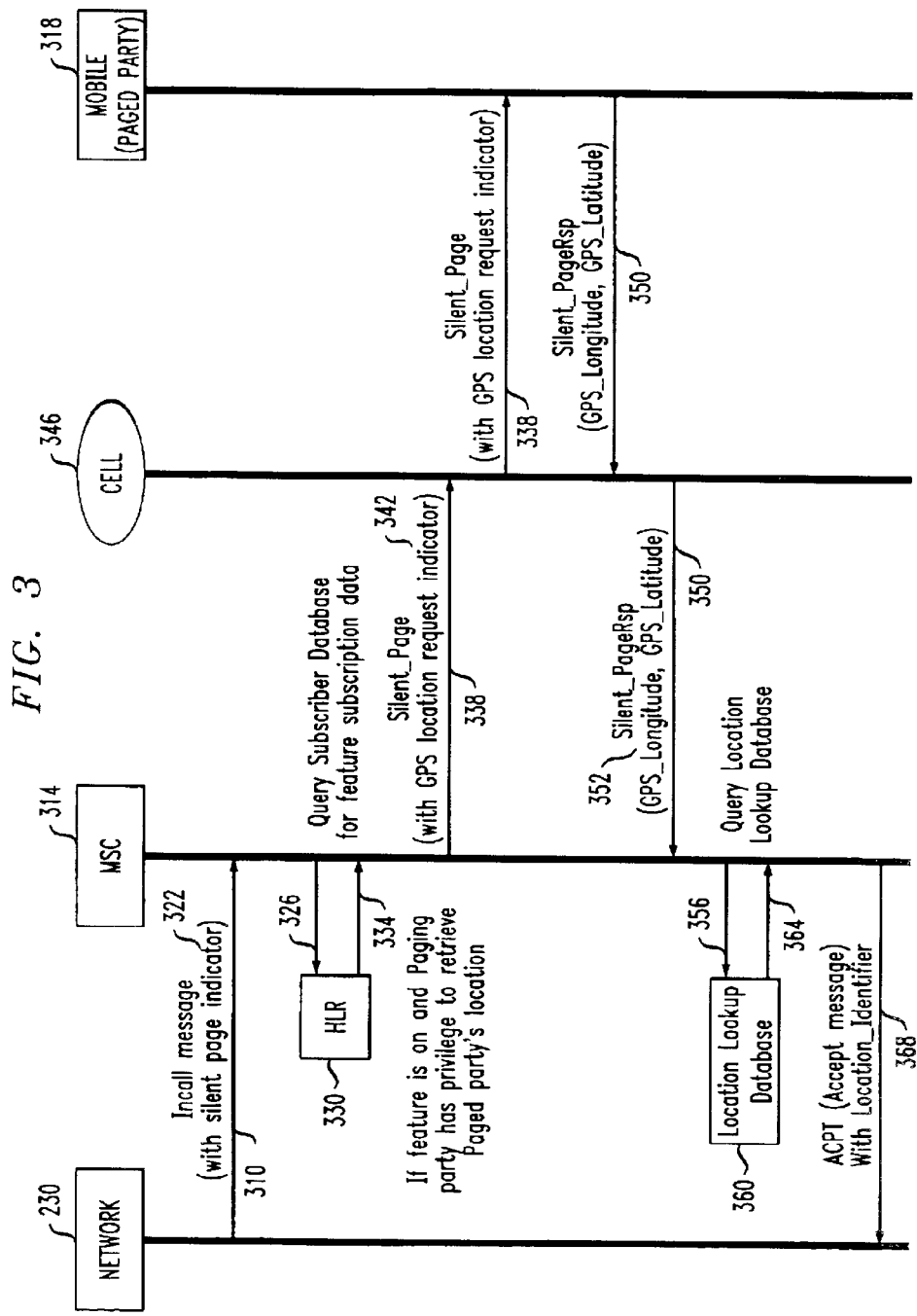
FIG. 3 is a call flow diagram outlining aspects of an embodiment of the method of FIG. 1 where the user equipment of the paged party is GPS enabled.

Referring to FIG. 3, in a scenario where user equipment of the paged party is GPS enabled, the Network 230 begins processing the Switch to Network Origination message 226 (of FIG. 2) by transmitting an Incall message 310 to a mobile switching center 314 serving user equipment 318 of the paged party. The Incall message 310 includes information originally presented in the Origination message 214 (of FIG. 2) and relayed in the Switch to Network Origination message 226. The Mobile Switching Center (MSC) 314 extracts 118 paged and paging party identification information from the Incall message 310. The Incall message 310 includes a Silent Page indicator 322. The MSC 314 responds to the Incall message 310 and Silent Page indicator 322 by generating one or more subscriber database queries 326. For example, the Subscriber Database Queries 326 are transmitted to a Home Location Register (HLR) 330 of the paged party. The Subscriber Database Queries 326 are to determine 122 if the paged party subscribes to a location provision service, and if so, if the location requestor or paging party is entitled to location information. Additionally, the Subscriber Database Queries 326 may request information as to whether or not the User Equipment 318 of the paged party includes a Global Positioning System (GPS) receiver, and may thereby provide GPS coordinates of the User Equipment 318 of the paged party. The Subscriber Database or Home Location Register 330 responds to the Queries 326 with Subscriber Database Responses 334.

In the exemplary scenario, the paged party does subscribe to the location provision service and the paging party or location requester is entitled to receive location information. Additionally, information provided by the subscriber database responses 334 allows the MSC 314 to determine 134 that the user equipment 318 of the paged party is GPS enabled. Therefore, the MSC 314 transmits a Silent Page Request 338 including a GPS location request indicator 342 to a Cell Site 346 serving the Mobile User Equipment 318 of the paged party. The Cell Site 346 relays the Silent Page Request message 338 to the User Equipment 318 of the paged party.

The User Equipment 318 of the paged party responds by transmitting a Silent Page Response message 350 to the Cell Site 346. The cell site 346 relays the Silent Page Response message 350 to the MSC 314. The Silent Page Response message includes GPS coordinates 352. For example, the GPS coordinates include a longitude and latitude. The MSC 314 receives 146 the coordinates and may transmit 154 the coordinates in their raw form or may convert 150 the coordinates into a more user friendly format.

For example, in the exemplary scenario, the MSC 314 transmits a Location Lookup query 356 to a Location Lookup Database 360. The Location Look-up Database 360 may be housed in a Home Location Register. Alternatively, the Location Lookup Database 360 is local to the MSC 314 or is part of a remote network adjunct. The Location Lookup Database 360 provides a common description for the location associated with the coordinates received in the Silent Page Response message 350. For example, the Location Lookup Database 360 transmits a Location Identifier message 364 including the city name, state name, street address, nearest intersection, distance and direction from a landmark or an abbreviation therefore. The MSC 314 then includes the common location description in an Accept message 368 transmitted to the Network 230. The Network 230 generates the Answer message 234 based on information contained within the Accept message 368.

Figure 4:
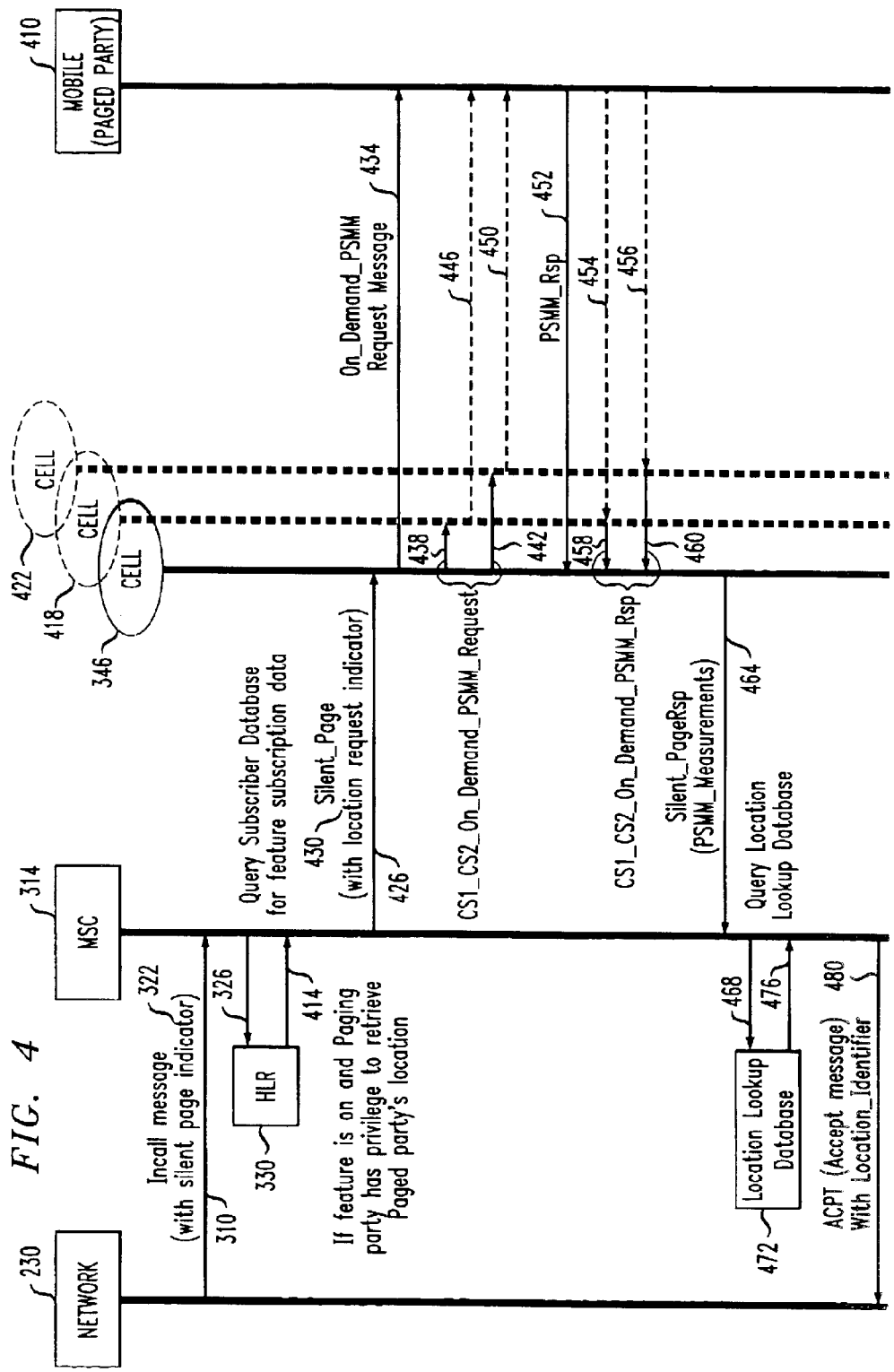
FIG. 4 is a call flow diagram outlining aspects of an embodiment of the method of FIG. 1 where the user equipment of the paged party is not GPS enabled.

Referring to FIG. 4, if User Equipment or a Mobile Device 410 of the paged party is not GPS enabled, the processing of the Origination message 226 proceeds in a manner similar to that described in reference to FIG. 3 up to the point that the MSC 314 attempts to determine whether or not the Mobile Device 410 of the paged party can provide GPS coordinates. Instead of receiving an indication that the Mobile Device 410 of the paged party is GPS enabled, the MSC 314 receives an indication that the Mobile Device 410 of the paged party is not GPS enabled. For example, the MSC receives subscriber database query results 414 that indicate that the Mobile Device 410 of the paged party is not GPS enabled. Alternatively, the MSC queries the Mobile Device 410 directly and either receives no response or a response indicating that the Mobile Device 410 is not GPS enabled. The MSC 314 then attempts to retrieve location information regarding the Mobile Device 410 of the paged party by some other means. For example, the MSC initiates a cellular triangulation procedure.

For instance, the MSC 314 uses the Serving Cell Site 346 as a reference cell site. The Serving Cell Site 346 includes network information identifying Secondary Cell Sites 418, 422, that may also be in contact or able to reach the User Equipment 410 of the paged party. The MSC 314 sends a Silent Page Request message 426 to the Serving Cell Site 346. The Silent Page Request message 426 includes a location request indicator 430. Since the location request indicator 430 is not a GPS location request, the Serving Cell Site 346 in this exemplary scenario, interprets the Silent Page Request 426 as a request for cellular triangulation. The serving cell site 346 sends an On_Demand_PSMM request message 434 to the Mobile Device 410 of the paged party. Additionally, the Serving Cell Site 346 sends CS1_CS2_On_Demand_PSMM Request messages 438, 442 to the secondary cell sites 418, 422. In response, the Secondary Cell Sites 418, 422 transmit On_Demand_PSMM Request messages 446, 450 to the Mobile Device 318 of the paged party. It is to be understood that the Serving Cell Site may enlist the services of additional secondary cell sites. For example, the Serving Cell Site 346 may enlist the services of 2 to about 5 cell sites in the vicinity of the Mobile Device 410 of the paged party in order to perform cellular triangulation. The Mobile Device 410 of the paged party responds to each of the cell sites 346, 418, 422 with respective PSMM_Rsp messages 452, 454, 456. The Secondary Cell Sites 418, 422 in turn transmit CS1_CS2_On_Demand_PSMM_Rsp messages 458, 460 to the Serving or Referenced Cell Site 346. The PSMM_Rsp messages 452, 454, 456, 458, 460 include signal strength and/or message delay parameter values. The serving or referenced cell site 346 transmits these signal strength and/or message delay parameter values to the MSC 314 in a Silent Page Response message 464. The MSC 314 uses the signal strength and/or message delay parameter values to calculate a position of the mobile device relative to the cell sites (e.g., 346, 418, 422). This relative position is combined with absolute positions of the cell sites (e.g., 346, 418, 422), available to the MSC 314, in order to determine an absolute position of the Mobile Device 410 of the paged party. This raw absolute position may be transmitted to the location requester or paging party. However, in the exemplary embodiment, in a manner similar to that described in reference to FIG. 3, the calculated absolute position of the mobile device 410 can be included in a Common Location Description Request message or database query 468 sent by the MSC 314 to a Location Lookup Database 472. The calculated location coordinates included in the Location Lookup Database query 468 may be in a different format than used in the GPS based location lookup query 356. The Location Lookup Database 472 responds to the database query 468 with a Location Identifier message or Query Response 476 including a common description of the location of the Mobile Device 410. The MSC 314 includes that description in an Accept message 480 transmitted to the network 230 as a response to the Incall message 310. Information in the Accept message 480 is used to generate the Answer message 234 described in reference to FIG. 2.

The procedures of method 110 can be performed by a wide variety of network elements. The responsibility for carrying out the procedures of the method can be distributed among a variety of network elements or implemented in a more concentrated fashion by various combinations of hardware and software.

Figure 5:
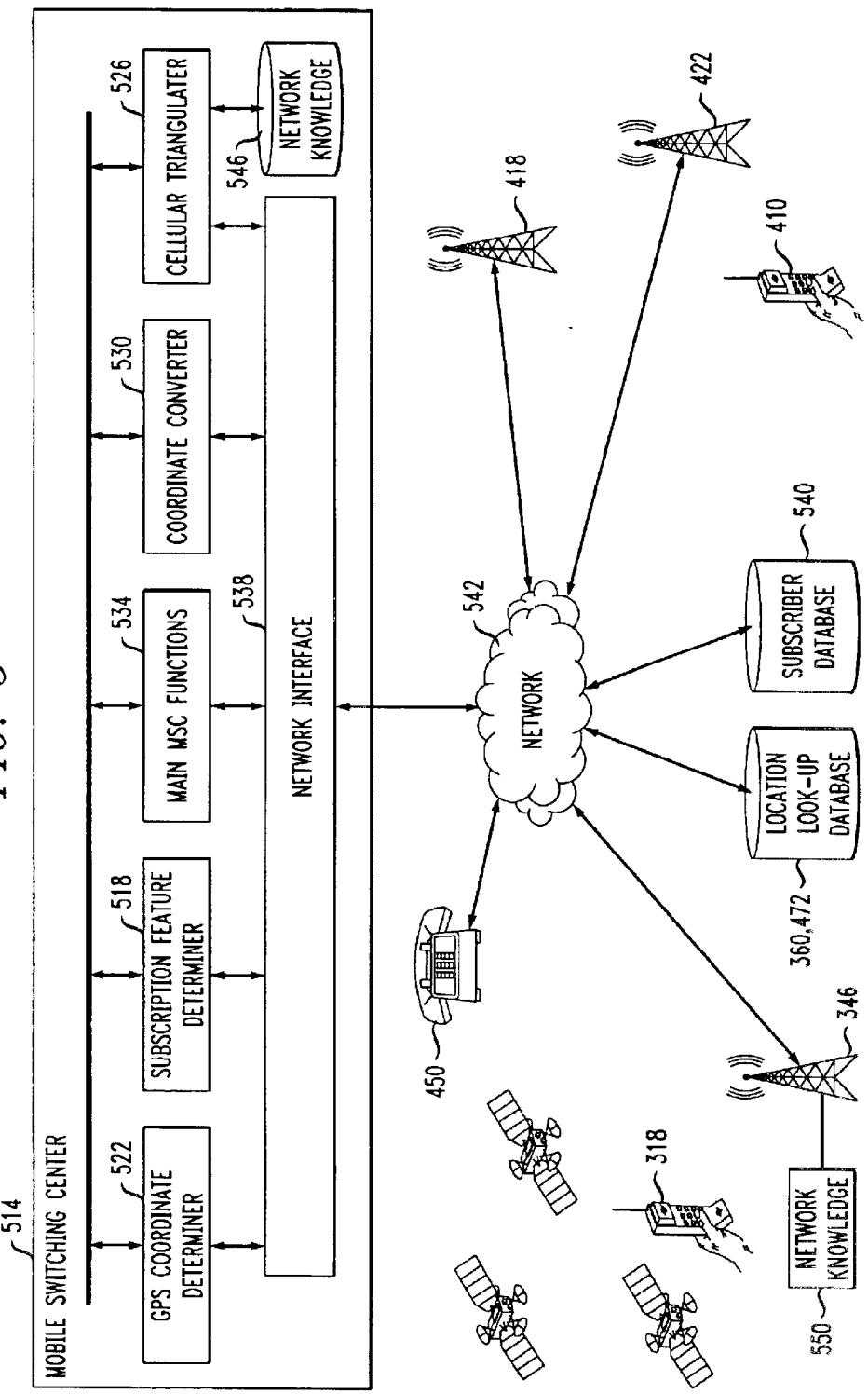
FIG. 5 is a block diagram of a system for providing location information regarding mobile user equipment of a paged party to user equipment of a paging party.

Referring to FIG. 5, in one implementation, a Mobile Switching Center 514 includes a Subscription Feature Determiner 518, a GPS Coordinate Determiner 522, a Cellular Triangulator 526, and a Coordinate Converter 530. Of course, the Mobile Switching Center 514 also includes Main MSC Functions 534 as are known in the art, and the MSC 514 includes a Network Interface 538 for communicating with a network 542 for carrying out the Main MSC Functions 534 and the procedures of the method 110.

The Subscription Feature Determiner 518 may determine 122 if a paged party subscribes to a location provision service and if so may determine 126 if the paging party is entitled to location information about the paged party. For example, the Subscription Feature Determiner 518 may generate the Subscriber Database Query messages 326 for retrieving a state of a location provision feature activation bit and, if applicable, a list of parties or user equipment to which location information may be provided. For instance, the Subscription Feature Determiner 518 communicates with a Subscriber Database 540 by sending the Query messages 326 through the Network Interface 538 and through the Network 542 to the Subscriber Database 540. Information from the Subscriber Database 540 is delivered to the Subscription Feature Determiner 518 through the Network 542 and the Network Interface 538. The Subscription Feature Determiner 518 may analyze the delivered subscription information to determine if the User Equipment of the paged party is GPS enabled. The results of such a determination are communicated to the GPS Coordinate Determiner 522 and/or the Cellular Triangulator 526.

If the Subscription Feature Determiner 518 informs the GPS Coordinate Determiner 522 that the User Equipment of the paged party is GPS enabled, the GPS Coordinate Determiner 522 generates and transmits a Silent Page (with GPS location request indication message 342). The Silent Page message 338 is transmitted to the User Equipment (e.g. 318) of the paged party through the services of the Network Interface 538, the Network 542 and a Serving Cell Site (e.g. 346).

Alternatively, if the Subscription Feature Determiner 518 does not provide an indication as to whether or not the User Equipment of the paged party is GPS enabled, the GPS Coordinate Determiner 522 may generate a query as to whether or not the User Equipment of the paged party can provide GPS coordinates. The GPS query may be transmitted to the Subscriber Database 540 through the Network Interface 538 and intervening Network 542. Alternatively, the GPS query may be directed to the User Equipment of the paged party (e.g. 318, 410) via the Network Interface 538, Network 542 and a Serving Base Station (e.g. 346). If a response to the query indicates that the User Equipment of the paged party is GPS enabled, the GPS coordinate determiner 522 generates and transmits a Silent Page message 338 with a GPS location request indicator 342 as described above. If no response is received or if the response indicates that the User Equipment of the paged party is not GPS enabled, the GPS Coordinate Determiner 522 so informs the Cellular Triangulator 526.

When informed that location information of the calling party is desired but that GPS coordinates are unavailable, the Cellular Triangulator 526 orchestrates the collection of locating information with regard to the User Equipment (e.g. 410) of the paged party. For example, the Cellular Triangulator 526 generates and coordinates the transmission of a plurality of PSMM Data Collection messages 434, 446, 450. For instance, the Cellular Triangulator 526 transmits a Silent Page message 426 to the Serving Cell Site 346. The Serving Cell Site 346 accesses knowledge 550 it has regarding the identity and location of a plurality of neighboring cells sites (e.g. 418, 422) that may be in range of the User Equipment of the paged party (e.g. 410). The Serving Cell Site 346 then initiates the transmission of the PSMM data collection messages (On_Demand_PSMM Request messages 434, 446, 450) by transmitting an On_Demand_PSMM_Request message to the User Equipment 410 of the paged party and by transmitting CS1_CS2_On_Demand_PSMM_Request messages to the neighboring or Secondary Cell Sites 418, 422. In turn, the neighboring or Secondary Cell Sites 418, 422 transmit On_Demand_PSMM Request messages 446, 450 to the User Equipment 410 of the paged party. The User Equipment 410 of the paged party responds to each of the On_Demand_PSMM Request messages 434, 446, 450 by transmitting PSMM_RSP messages 452, 454, 456 to the respective Cell Sites 346, 418, 422. The Secondary Cell Sites 418, 422 respond by transmitting CS1_CS2_On_Demand_PSMM_Rsp messages 458, 460 to the Serving Cell Site 346. The Serving Cell Site 346 compiles the information from the PSMM Response messages 452, 458, 460 into a Silent Page Response message 464 including PSMM measurements, and transmits the Silent Page Response message 464 to the Cellular Triangulator 526 through the services of the Network 542 and Network interface 538. The Cellular Triangulator 526 then uses information contained in the Silent Page Response message 464 and knowledge 546 about the locations of the Cell Sites 346, 418, 422 to determine a location of the User Equipment (e.g. 410) of the paged party. For example, the Cellular Triangulator 526 uses message delay information and/or signal strength information contained within the Silent Page Response message 464 to determine a relative position of the User Equipment of the paged party to the Cell Sites 346, 418, 422. The Cellular Triangulator 526 combines that calculated relative position with the knowledge 546 available regarding the absolute positions of the cell sites 346, 418, 422 to determine an absolute position, or coordinates, of the user equipment (e.g. 410) of the paged party.

Coordinate information, whether collected from a GPS Silent Page Location Response message 350 received by the GPS coordinate determiner 522, or generated through Cellular Triangulation by the Cellular Triangulator 526, may be delivered to the Coordinate Converter 530. If so, the Coordinate Converter 530 generates a Coordinate Conversion message 356, 468 and transmits the Coordinate Conversion message 356, 468 to the Common Location Description Look-up Database 360, 472 through the services of the Network Interface 538 and the Intervening Network 542. The Location Look-up Database 360, 472 responds with a common description or location identifier 364, 476 related to the position of the User Equipment (e.g. 410) of the paged party. The location identifier 364, 476 is transmitted to the Coordinate Converter 530 through the services of the Network 542 and the Network interface 538. The Coordinate Converter 530 generates an Accept message 368, 480 and transmits the Accept message 368, 480 to the Network 230. The Network generates an Answer message 234 which is used to generate a Silent Answer message, which is transmitted to User Equipment 210 of the paging party. Again, the message 368, 480 is transmitted through the services of the Network Interface 538 and the intervening Network 542. The Accept message 368, 480 includes the common description of the location of the paged party. The User Equipment 210 of the paging party may be a mobile or wired device. The location information may be displayed or communicated to the paging party during a call or instead of a call, and/or may be logged for future reference. Alternatively, unconverted coordinate information may be included in the accept message.

The invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

We claim:

1. A method operative to provide paged party location information in information made available to user equipment of a paging party, the method comprising:

receiving an origination message from the user equipment of the paging party;

extracting paged party identification information from the origination message;

determining that the paged party subscribes to location service based on the extracted paged party identification information;

determining a location of the paged party; and transmitting a message including a description of the location to the user equipment of the paging party.

2. The method of claim 1 wherein determining that the paged party subscribes to the location service comprises:

accessing user subscription information of a subscriber database of the paged party.

3. The method of claim 1 wherein determining the location of the paged party comprises:

determining that the user equipment of the paged party includes a GPS receiver; and requesting GPS coordinates from the user equipment of the paged party.

4. The method of claim 1 wherein determining the location of the paged party comprises:

determining that the user equipment of the paged party does not include a GPS receiver; and requesting coordinates of the paged party user equipment from a reference cell cite of the user equipment of the paged party.

5. The method of claim 1 wherein determining the location of the paged party comprises:

determining that the user equipment of the paged party does not include a GPS receiver; and requesting coordinates of the user equipment of the paged party be determined by cellular triangulation.

6. The method of claim 4 further comprising:

transmitting a first PSMM_Request message from a first cell site to the user equipment of the paged party;

receiving a first response to the first PSMM_Request message;

determining a first delay from the first response;
transmitting a second PSMM_Request message from a second cell site to the user equipment of the paged party;
receiving a second response to the second PSMM_Request message;
determining a second delay from the second response;
transmitting a third PSMM_Request message from a third cell site to the user equipment of the paged party;
receiving a third response to the third PSMM_Request message;
determining a third delay from the third response; and,
determining a relative position of the user equipment of the paged party to the first, second and third cell sites based on the first, second and third delays.

7. The method of claim 4 further comprising:
transmitting a plurality of PSMM_Request messages from a plurality of cell sites to the user equipment of the paged party;
receiving a plurality of responses to the plurality of PSMM_Request messages;
determining a plurality of delays from the plurality of responses; and,
determining a relative position of the user equipment of the paged party to the plurality of cell sites from the plurality of delays.

8. The method of claim 6 further comprising:
calculating an absolute position of the user equipment of the paged party from the relative position of the user equipment and known positions of the first second and third cell sites.

9. The method of claim 7 further comprising:
calculating an absolute position of the user equipment of the paged party from the relative position of the user equipment and known positions of the plurality of cell sites.

10. The method of claim 3 further comprising:
determining a common description of the location of the paged party.

11. The method of claim 10 wherein determining the common description comprises:
receiving the GPS coordinates; and
using the GPS coordinates as an index into a common location description database to determine at least one of an address, a city name, and a distance and heading from a landmark.

12. The method of claim 4 further comprising:
determining a common description of the location of the paged party.

13. The method of claim 12 wherein determining the common description comprises:
receiving the coordinates; and
using the coordinates as an index into a common location description database to determine at least one of an address, a city name, and a distance and heading from a landmark.

14. The method of claim 1 further comprising:
verifying that the paging party is included in a list of potential paging parties to which the paged party location information is to be provided.

15. A method operative to provide paged party location information to user equipment of a paging party, the method comprising:
receiving origination message from the user equipment of the paging party;
extracting paged party identification information from the origination message;
determining that the paged party subscribes to a location service based on the extracted paged party identification information;
determining if the user equipment of the paged party is GPS enabled;
requesting GPS coordinates from the user equipment of the paged party if the user equipment of the paged party is GPS enabled;
requesting cellular triangulation services be used to generate location information regarding the user equipment of the paged party if the user equipment of the paged party is not GPS enabled;
determining a common description of a location of the paged party based on the GPS coordinates or the generated location information;
including a representation of the common description of the location in a field of a message; and
transmitting the message to the user equipment of the paging party.

16. The method of claim 15 further comprising:
extracting paging party user equipment identification information from the origination message;
retrieving a list of potential paging party user equipment for which the paged party desires to provided location information;
comparing the extracted paging party user equipment identification information to entries in the list of potential paging party user equipment; and
determining that one of the entries in the list matches the extracted paging party user equipment identification information.

17. The method of claim 15 wherein determining that the paged party subscribes to a location service based on the extracted paged party identification information comprises:
querying a subscriber database associated with the paged party; and
retrieving location feature subscription information regarding the paged party.

18. The method of claim 15 wherein determining if the user equipment of the paged party is GPS enabled comprises:
extracting paged party user equipment identification information from the origination message; and,
retrieving GPS enablement status information regarding the paged party user equipment from a subscriber database of the paged party.

19. The method of claim 15 wherein determining if the user equipment of the paged party is GPS enabled comprises:
sending a GPS enablement query message to the user equipment of the paged party.

20. The method of claim 15 wherein requesting cellular triangulation services comprises:
transmitting a plurality of PSMM data collection messages to a respective plurality of cell sites within range of the user equipment of the paged party.

21. A system operative to provide paged party location information to user equipment of a paging party, the system comprising:
means for receiving an origination message from the paging party;
means for extracting paged party identification information from the origination message;
means for determining that the paged party subscribes to a location service based on the extracted paged party identification information;

means for determining a location of the paged party;
means for including a description of the location of the paged party in a message; and
means for transmitting the message including the description of the location to the user equipment of the paging party.

22. The system of claim 21 wherein the means for determining that the paged party subscribes to the location service comprises:
means for accessing user subscription information of a subscriber database of the paged party.

23. The system of claim 21 wherein the means for determining a location of the paged party comprises:
means for determining that the user equipment of the paged party includes a GPS receiver; and
means for requesting GPS coordinates from the user equipment of the paged party.

24. The system of claim 21 wherein the means for determining a location of the paged party comprises:
means for determining that the user equipment of the paged party does not include a GPS receiver; and
means for requesting coordinates of the paged party user equipment from a reference cell cite of the user equipment of the paged party.

25. The system of claim 21 wherein the means for determining a location of the paged party comprises:
means for determining that the user equipment of the paged party does not include a GPS receiver; and
means for requesting coordinates of the paged party user equipment be determined by cellular triangulation.

26. The system of claim 24 further comprising:
means for transmitting a first PSMM_Request message from a first cell site to the user equipment of the paged party;
means for receiving a first response to the first PSMM_Request message;
means for determining a first delay from the first response;
means for transmitting a second PSMM_Request message from a second cell site to the user equipment of the paged party;
means for receiving a second response to the second PSMM_Request message;
means for determining a second delay from the second response;
means for transmitting a third PSMM_Request message from a third cell site to the user equipment of the paged party;
means for receiving a third response to the third PSMM_Request message;
means for determining a third delay from the third response; and,
means for determining a relative position of the user equipment of the paged party to the first, second and third cell sites based on the first, second and third delays.

27. The system of claim 24 further comprising:
means for transmitting a plurality of PSMM_Request messages from a plurality of cell sites to the user equipment of the paged party;
means for receiving a plurality of responses to the plurality of PSMM_Request messages;
means for determining a plurality of delays from the plurality of responses; and,
means for determining a relative position of the user equipment of the paged party to the plurality of cell sites from the plurality of delays.

28. The system of claim 24 further comprising:
means for calculating an absolute position of the user equipment of the paged party from the relative position of the user equipment of the paged party and known positions of the first, second and third cell sites.

29. The system of claim 25 further comprising:
means for calculating an absolute position of the user equipment of the paged party from the relative position of the user equipment and known positions of the plurality of cell sites.

30. The system of claim 21 wherein the means for determining a description of a location of the calling party comprises:
means for receiving the GPS coordinates; and
means for using the GPS coordinates as an index into a common location description database to determine at least one of an address, a city name, and a distance and heading from a landmark.

31. The system of claim 21 wherein the means for determining a description of a location of the calling party comprises:
means for receiving the coordinates; and
means for using the coordinates as an index into a common location description database to determine at least one of an address, a city name, and a distance and heading from a landmark.

32. The system of claim 21 further comprising:
means for verifying that the paging party is included in a list of potential paging parties for which the paged party location information is to be provided.

33. A mobile switching center operative to provide paged party location information to user equipment of a paging party, the mobile switching center comprising:
a coordinate determiner operative to determine geographic coordinates of user equipment of a paged party identified in information extracted from an origination message;
a subscription feature determiner operative to determine if the paged party subscribes to a location service based on the identification information extracted from the origination message;
a coordinate converter operative to determine a common description of a geographic location associated with the geographic coordinates determined by the coordinate determiner; and,
a network interface operative to transmit the common description to the user equipment of the paging party.

34. The mobile switching center of claim 33 wherein the coordinate determiner comprise:
a GPS coordinate determiner operative to send a request for GPS coordinates to the user equipment of the paged party and receive GPS coordinates from the user equipment of the paged party.

35. The mobile switching center of claim 33 wherein the coordinate determiner comprise:
a cellular triangulator operative to coordinate the collection of measurements associated with the user equipment of the paged party and the calculation of geographic coordinates associated with the location of the user equipment of the paged party based on the collected measurements.

36. The mobile switching center of claim 35 wherein the cellular triangulator is operative to collect the measurements associated with the user equipment through the transmission of a plurality of PSMM_Request messages.

* * * * *